United States Patent [19]

Scott et al.

[11] Patent Number: 4,557,815

[45] Date of Patent: Dec. 10, 1985

[54] METHOD OF CONCENTRATING SILKA IN AN AQUEOUS ALKALI METAL SILICATE SOLUTION

[75] Inventors: Graham W. Scott, Northwich; James H. Steven, Runcorn, both of England

[73] Assignee: Imperial Chemical Industries PLC, London, England

[21] Appl. No.: 653,047

[22] Filed: Sep. 21, 1984

[30] Foreign Application Priority Data

Sep. 23, 1983 [GB] United Kingdom .............. 8325479

[51] Int. Cl.$^4$ .......................... C25B 7/00; C25B 1/16
[52] U.S. Cl. ................... 204/182.2; 204/98; 204/301; 423/332; 423/335; 423/339
[58] Field of Search ............ 204/86, 98, 101, 180 P, 204/301; 423/332, 335, 339

[56] References Cited

U.S. PATENT DOCUMENTS

| | | | |
|---|---|---|---|
| 3,654,105 | 4/1972 | Chilton | 204/101 |
| 3,668,088 | 6/1972 | Iler et al. | 204/101 |
| 4,124,471 | 11/1978 | Lieb et al. | 204/180 P |
| 4,147,605 | 4/1979 | Schenker et al. | 204/180 P |
| 4,203,822 | 5/1980 | Schenker et al. | 204/180 P |
| 4,303,487 | 12/1981 | Carlin et al. | 204/180 P |
| 4,387,008 | 6/1983 | Winyall et al. | 204/101 |
| 4,410,405 | 10/1983 | Bergna | 204/180 P |
| 4,508,607 | 4/1985 | Winyall | 204/180 P |

FOREIGN PATENT DOCUMENTS 39-2234 4/1964 Japan ................ 204/180 P

Primary Examiner—Andrew H. Metz
Assistant Examiner—Terryence Chapman
Attorney, Agent, or Firm—Cushman, Darby & Cushman

[57] ABSTRACT

The ratio of silica to alkali in silicate liquors is increased, for example to convert alkaline grades to neutral grades, by passing the liquors through an electrodialysis stack comprising alternating cation exchange membranes and bipolar membranes mounted between an anode and a cathode, the membranes forming a concentrating cell between the anion exchange side of the bipolar membrane and the adjacent cation exchange membrane and a diluting cell between the cation exchange side of the bipolar membrane and the adjacent cation exchange membrane, the method comprising passing the silicate liquor through the diluting cells in the stack and passing water or an aqueous solution through the concentrating cells, whereby the silicate liquor is caused to lose alkali metal ions to the concentrating liquor and receive hydrogen ions from the bipolar membranes.

8 Claims, 2 Drawing Figures

METHOD OF CONCENTRATING SILKA IN AN AQUEOUS ALKALI METAL SILICATE SOLUTION

BACKGROUND OF THE INVENTION

1. Field of the Invention

The invention relates to the preparation of alkali metal silicates, and especially to sodium silicates, as these are used commercially for a wide range of applications.

2. Description of Related Art

Most sodium silicate liquors are produced by the Furnace route in which soda ash (sodium carbonate) and sand are fused together at high temperatures, e.g. around 1500° C. and the resulting glass is dissolved under pressure. Silicates in a wide range of grades can be produced in this manner, varying from those having $SiO_2:Na_2O$ weight ratio in the range 1.65 to 2.8 (often referred to as alkaline grades) to grades having higher ratios, e.g. up to about 4.0 (often referred to as neutral grades even though their solutions generally have pH values in excess of 11). Unfortunately, this route is highly energy dependent, and hence expensive to operate.

An alternative, lower energy, process, known as the Hydrothermal process, is also currently being operated. This process involves digestion of sand with caustic soda under pressure, and with much lower temperatures being required, significant savings in energy and manpower costs are achievable by this route. Unfortunately this process is unable to produce neutral grades. It has previously been proposed to overcome this by electrolysis of the resulting sodium silicate liquor in a standard electrolytic cell, having an anode compartment (containing an anode) and a cathode compartment (containing a cathode), the two compartments being separated by a single cation exchange membrane to keep the electrolysis products apart. This relies on an anode reaction to destroy hydroxyl ions in the anode compartment (forming water and releasing gaseous oxygen) while forming new hydroxyl ions in the cathode compartment (with release of hydrogen at the electrode). The driving current is carried through the membrane by the sodium ions passing through it and the net effect is the removal of sodium hydroxide from one stream to the other, even though the individual hydroxyl ions lost from one stream are not those being newly created in the other. Such electrolytic methods for increasing the $SiO_2:Na_2O$ weight ratios are claimed to be effective for dilute solutions, i.e. water contents of at least 75 weight %, and hence for enabling neutral grades to be produced via the Hydrothermal process more cheaply than via the Furnace route.

SUMMARY OF THE INVENTION

We have now devised another method for increasing the ratio of silica to alkali, which method can be operated with even lower energy costs, which can avoid the risk of electrode contamination inherent in electrolytic cells, and which can be used with silicate solutions of significantly higher solids content (thereby reducing evaporation costs). Accordingly we now provide a method for increasing the ratio of silica to alkali in an aqueous solution of alkali metal silicate, which method comprises passing the aqueous solution through an electrodialysis stack comprising a plurality of ion exchange membranes, each membrane having at least one adjacent membrane from which it is separated by at least one spacer, the spacer being shaped and positioned to form with the two membranes a cell having an inlet and outlet such that fluid can be caused to flow through the cell between the membranes and in contact therewith, alternate membranes being cation exchange membranes and bipolar membranes having a cation exchange side and an anion exchange side, the membranes together with the spacers between them forming a repeating cell pair comprising in sequence a concentrating cell formed by the anion exchange side of the bipolar membrane and its adjacent cation exchange membrane, and a diluting cell formed by the cation exchange side of the bipolar membrane and its adjacent cation exchange membrane, each of the individual cells being free from electrodes but the stack having adjacent to each end cell thereof an electrode compartment which contains an electrode separated from the contents of its adjacent end cell by the ion exchange membrane defining the boundary of that cell; the method further comprising feeding the solution of alkali metal silicates to the diluting cells and water or an aqueous solution to the concentrating cells, and applying a DC potential to the electrodes such that the electrode on the diluting cell side of the bipolar membranes becomes a cathode and the electrode on the concentrating cell side of the bipolar membranes becomes an anode; whereby the silicate streams are caused to lose sodium ions to the concentrating streams and receive hydrogen ions from the bipolar membranes, as they flow through the stack.

BRIEF DESCRIPTION OF THE DRAWINGS

This method operates by transferring ions through the membranes, and to illustrate how this is achieved, a specific embodiment of the invention will now be described with reference to the accompanying drawings, in which.

DESCRIPTION OF THE PREFERRED EMBODIMENTS

Figure 1:
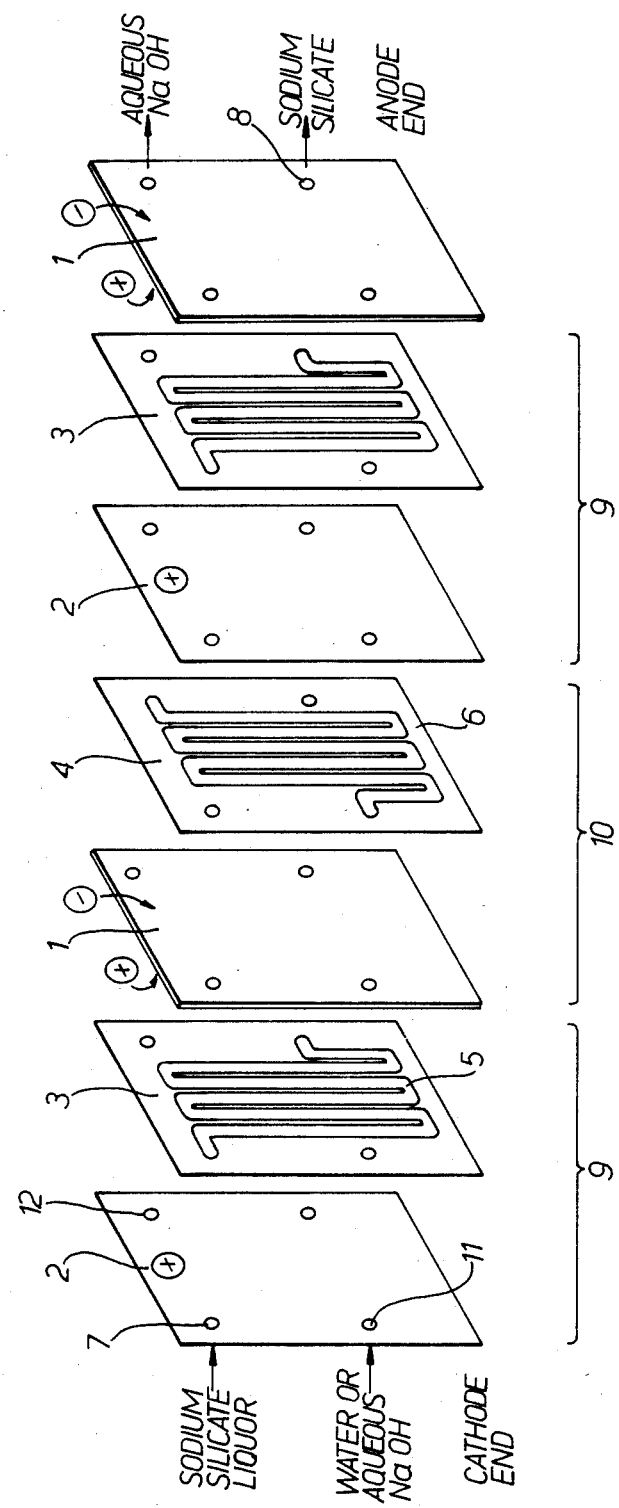
FIG. 1 is an exploded view of part of an electrodialysis stack showing how bipolar and cation exchange membranes are arranged alternately with the appropriate spacers between them.

In FIG. 1, bipolar membranes 1 and cation exchange membranes 2 are arranged alternately throughout the stack with typically several hundred membranes being used in a stack for a commercial production plant. Between adjacent membranes are spacers of two sorts, one 3 for the diluting sodium silicate liquor streams and the other 4 for the intervening streams; although in practice the spacers themselves are usually of identical assymetric shape, being orientated differently to give the different configurations necessary, e.g. as shown in the drawings where two inlet and two outlet manifolds are formed by rotation of the spacers through 180°. The spacers each have a serpentine slot 5 providing a tortuous path along which liquid can flow from one end to the other, in contact with the adjacent membranes 1, 2. Around the inner tortuous path region is a continuous edge portion 6 to provide a seal against loss of liquid through the edges, each adjacent pair of membranes and their intervening spacer forming a cell through which the liquids can flow, each membrane thus also being part of the two cells on either side of it. Extending right through the stack are four manifolds formed by aligned holes in the edge portions of the membranes and spacers. The tortuous paths of alternate cells connect different manifolds, so that in one cell a sodium silicate liquor inlet manifold 7 is connected to a sodium silicate outlet manifold 8 by the tortuous path, thus producing a diluting cell 9 for carrying the diluting liquor stream. In the two adjacent concentrating cells 10, the tortuous path connects an inlet manifold 11 for the water or aqueous caustic concentrating stream, with the caustic outlet manifold 12. The whole stack is completed by an anode compartment at one end and a cathode compartment at the other (neither compartment being shown in FIG. 1), there being no electrodes in the individual diluting and concentrating cells.

Figure 2:
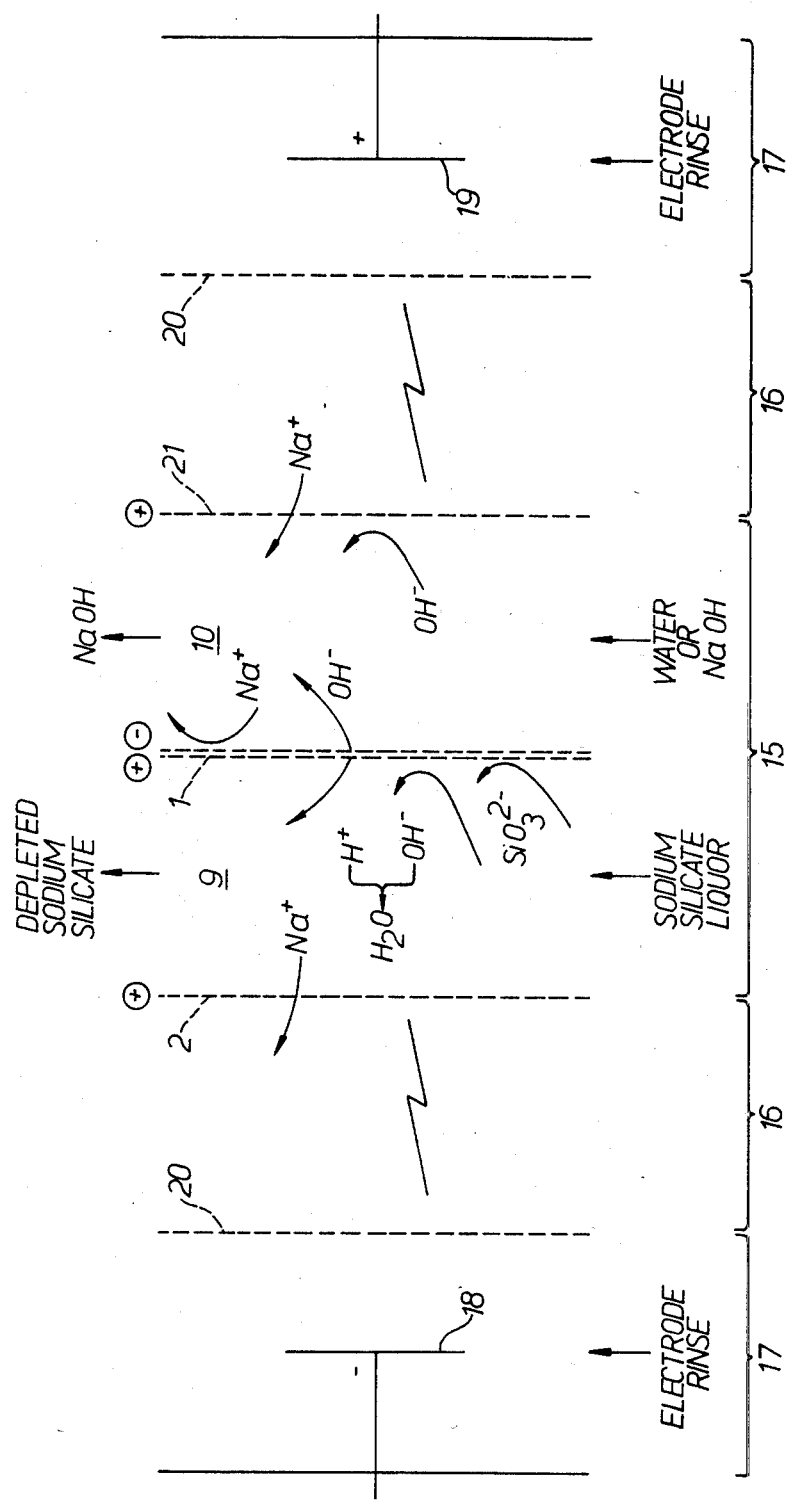
FIG. 2 is diagrammatic representation of a typical cell pair showing ion movements between the cells.

FIG. 2 shows a single cell pair 15 comprising a diluting cell 9 carrying a sodium silicate liquor stream and a concentrating cell 10 carrying a caustic stream (which may start as water). On either side of the cell pair are shown spaces 16 representing the remaining cell pairs of the stack. At either end are electrode compartments 17 containing a cathode 18 and an anode 19 respectively. Electrode rinse streams are passed through the electrode compartments, and these are separated from the contents of the adjacent end cells of the stack by the ion exchange membranes 20 forming the outer boundaries of those end cells.

In both drawings, a positive or negative sign on a membrane is meant to indicate the ion species which will pass through the membrane (or through one side of it in the case of the bipolar membrane) rather than the ions of which it is formed. Thus for example, a cation exchange membrane comprising immobilised anions will pass cations but block anions, and is thus represented in these drawings with a positive sign.

In use, sodium silicate liquor is supplied to the appropriate manifold 7 which distributes it to all the diluting cells 9. Water or aqueous caustic (or indeed almost any other aqueous solution, although the presence of other solutes would contaminate a potentially useful by-product) is fed to the other inlet manifold 11 and this is likewise distributed to flow through all the concentrating cells 10. As the silicate liquor flows along the tortuous path between the membranes, the sodium ions are attracted towards the cathode, and some will pass through the cation exchange membrane into the adjacent concentrating cell 16. However, once in that adjacent cell they are trapped and prevented from travelling further towards the cathode by the next membrane, which is an anion exchange side of a bipolar membrane. The anions of the sodium silicate liquor, i.e. the hydroxyl and silicate ions, are prevented from migrating out of that cell in the direction of the anode by the cation exchange side of the biplar membrane forming the cell wall on that side.

In the bipolar membrane, water seeks to maintain an equilibrium in its molecular/ionised water ratio, but under the influence of the stack voltage, the protons will move towards the cathode and some will pass through the cation exchange side into the silicate stream, where they will form water with the free hydroxyl ions in that diluting stream. The hydroxyl ions in the bipolar membrane will likewise migrate towards the anode and some will pass through the anion exchange side of that membrane 1 into the adjacent concentrating stream.

The overall result of these migrations is that the concentrating stream gains in caustic and the sodium silicate liquor becomes progressively depleted in both sodium and hydroxyl ions.

Depletion of the sodium silicate liquor by the present method is achieved by migration of ions without any of these ions being produced by electrode reactions. However, even the present migratory method cannot be totally divorced from electrode reactions, as it is the electrode reactions occuring at either end of the stack that power the migrations through the cell membranes. However, the reactions at the single pair of electrodes suffices to furnish the migrations of the whole stack, typically comprising up to several hundred cell pairs in a commercial plant scale stack, and the electrode energy costs are shared by the whole stack. Moreover, as the electrode reactions themselves do not affect the nature of the migrations throughout the stack, the most cost effective electrode reactions can be selected and carried out by bathing the electrodes in a rinse appropriate to the selected reaction. In particular, a preferred process is one which comprises maintaining each electrode in an electrode rinse comprising a conducting liquid substantially free from silicate ions.

The intermembrane spacers perform two main roles, i.e. to hold the membranes spaced apart to enable liquids to flow between them, and to distribute the liquid flow by defining the path for it to take. Usually they are also required to promote turbulence in the liquid as it flows. There are two types of spacer presently in use, these being known generally as sheet flow and tortuous path spacers. The former may be merely a plastic gasket sealing around the perimeter of the cell, with built in manifolds and entry and exit ports, but usually it also incorporates a turbulence promoting plastic mesh. In contrast a tortuous path spacer (e.g. as shown in FIG. 1) confines the liquid flow to a serpentine path winding its way to and fro between and in contact with the membranes, giving a flow path which compared with that provided by a sheet flow spacer, is longer, narrower and usually of constant cross sectional area. Examples of tortuous path spacers are those used by Ionics Inc in their electrodialysis plants.

Sheet flow spacers require much lower fluid velocities (5–20 cm sec$^{-1}$) for a similar degree of turbulence. They also mask the ion exchange membrane to a lesser extent than do the tortuous path spacers and are therefore more economical in membrane usage. The high liquid velocities used in tortuous path stacks result in higher pressure drops than are generally used in sheet flow systems, a typical pressure drop through a commerical tortuous path cell being over 2 bar. However, in the present process there is a tendency for silica to become deposited readily if the optimum conditions are unduly departed from, and we have now found that inclination to deposit silica inadvertently or even to build up deposits of silica in the cells, is significantly less with the tortuous path configuration. Hence in the present process we prefer that at least the spacers of the cells carrying the silicate liquors be of the tortuous path type.

Even the so-called neutral grades of sodium silicate liquors generally have pH values only as low as 11, and when reduced to a pH below 9, silica will generally be deposited. We therefore prefer to keep the pH of the silicate liquor above 9 throughout the cell, including localised conditions that may occur adjacent to the membranes. To this end we prefer to use a current density which is less than 25 mA cm$^{-2}$, a flow velocity greater than 25 cm sec$^{-1}$ and a temperature greater than 25° C.

The onset of silica deposition can generally be detected by monitoring the stack voltage, a rise in the voltage inidicating silica deposition. A particularly preferred process is one comprising maintaining the above conditions within at least the silicate liquor streams, monitoring the voltage across the electrodes, and whenever the voltage starts to rise, decreasing the current density within the range 3–25 mA cm$^{-2}$, and/or increasing the flow velocity within the range 25–50 cm sec$^{-1}$ by an amount sufficient at least to stop any further rise. In carrying out this particular preferment it is desirable to maintain the current density as high as possible to maximise throughput. A higher current density may generally be used with a higher flow rate, but at the expense of higher energy consumption in achieving that higher flow rate. Hence a corollary to the above particular preferment is that while monitoring the voltage it is also preferred to raise the current density to the highest value within the range 3–25 mA cm$^{-2}$ and/or to reduce the flow velocity to the lowest value within the range 25–50 cm sec$^{-1}$ which can be achieved without substantial increase in stack voltage. While it is desirable to use as high a temperature as possible, most currently available membranes impose an upper limit of 60°–65° C. although higher temperatures could be used to advantage if suitable membranes should become available in the future. However, where the raw liquor is available (e.g. direct from the hydrothermal process) at only some intermediate temperature e.g. 30°–40° C., there would seem to be little advantage in supplying further heat.

Preferred initial concentrations for the silicate liquors lie within the range 20–30 wt % SiO$_2$, especially around the middle of that range for a typical alkaline silicate having a weight ratio of 2.4, this gives a total solids content range of (20+8.3=) about 28 to (30+12.5=) about 43 wt %, and correspondingly a water content of 72 to 57 wt % (this being a lower water content than the 75 wt % desirable when using an electrolytic cell). The lower the water content, the lower is the total quantity of energy needed to evaporate it off.

We claim:

1. A method for increasing the ratio of silica to alkali in an aqueous solution of alkali metal silicate which method comprises:

(1) passing the aqueous silicate solution through an electrodialysis stack, said stack comprising alternating cation-exchange membranes and bipolar membranes having a cation-exchange side and an anode-exchange side, the membranes being mounted between electrodes and spaced apart to form a plurality of cell pairs comprising a concentating cell between the cation-exchange membrane and the anion-exchange side of the bipolar membrane and a diluting cell between the cation-exchange side of the bipolar membrane and the adjacent cation-exchange membrane,
    (2) applying a DC potential to the electrodes to form an anode and a cathode,
    (3) feeding the aqueous silicate solution to the diluting cells in the stack,
    (4) feeding water or an aqueous solution to the concentrating cells in the stack, and
    (5) withdrawing from the diluting cells the aqueous silicate solution depleted of alkali metal ions.

2. A method as claimed in claim 1 wherein the pH of the silicate solution is maintained above 9 throughout its passage through the cells.

3. A method as claimed in claim 1 wherein the voltage across the electrodes is monitored and whenever the voltage starts to rise the current density is decreased and/or the silicate solution flow density is increased by an amount sufficient to at least stop any further rise in the voltage.

4. A method as claimed in claim 3 wherein the current density is maintained in the range 3–25 mAcm$^{-2}$ and the solution flow density is maintained in the range 25–50 cm sec$^{-1}$.

5. A method as claimed in claim 3 or claim 4 which utilizes the maximum current density and the minimum solution flow velocity which can be achieved without a substantial increase in stack voltage.

6. A method as claimed in claim 4 wherein current density is less than 25 mAcm$^{-2}$, solution flow viscosity is greater than 25 cm sec$^{-1}$ and the temperature of the solution is greater than 25° C.

7. A method as claimed in claim 1 wherein the silicate solution initially contains 20–30% by weight silica.

8. A method as claimed in claim 1 wherein said aqueous solution fed to the other cells in the stack is a solution of an alkali metal hydroxide.

* * * * *